US007320139B2

(12) United States Patent
Audebert

(10) Patent No.: US 7,320,139 B2
(45) Date of Patent: *Jan. 15, 2008

(54) DATA PROCESSING SYSTEM FOR APPLICATION TO ACCESS BY ACCREDITATION

(75) Inventor: Yves Audebert, Los Gatos, CA (US)

(73) Assignee: Activcard, Suresnes Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/253,559

(22) Filed: Oct. 20, 2005

(65) Prior Publication Data

US 2006/0037066 A1     Feb. 16, 2006

Related U.S. Application Data

(63) Continuation of application No. 09/723,284, filed on Nov. 28, 2000, now Pat. No. 6,988,210.

(30) Foreign Application Priority Data

Dec. 17, 1999    (FR)    .................................. 99 15980

(51) Int. Cl.
*H04L 9/00* (2006.01)
*H04L 9/16* (2006.01)

(52) U.S. Cl. .............................. 726/5; 726/2; 713/155

(58) Field of Classification Search .................. 726/5, 726/2; 713/155
See application file for complete search history.

(56) References Cited

U.S. PATENT DOCUMENTS 5,887,065 A    3/1999    Audebert (Continued)

FOREIGN PATENT DOCUMENTS

EP    0929025    7/1999
FR    2676291    11/1992

OTHER PUBLICATIONS

LuckHardt, "Passwort Portfolio", CT Magazin Fuer Computer Technik, DE, Verlag Heinz Heise.

(Continued)

*Primary Examiner*—Kambiz Zand
*Assistant Examiner*—William S Powers
(74) *Attorney, Agent, or Firm*—Stevens, Davis, Miller & Mosher, LLP

(57) ABSTRACT

This system for executing a program to which access by a user is controlled by credentials includes a terminal (T), first memory means (F) associated with said program for storing at least first credentials specific to said user, access control means for authorizing access to said program in response to a match between said first credentials and second credentials applied via said terminal, and a security device (PSD) personal to said user, associated with said terminal and including second memory means (M) for secure storage of said second credentials. The terminal (T) includes at least some of credentials management means (CMP) including means for reading said second credentials and transmitting them to said access control means in response to presentation of a request to access said program, and credentials updating; means for selectively commanding the generation and loading into said first and second memory means (F, M) of new credentials replacing the credentials previously stored.

26 Claims, 7 Drawing Sheets

U.S. PATENT DOCUMENTS 5,964,700 A * 10/1999 Tallman et al. ............. 600/300
6,611,914 B1 * 8/2003 Lee et al. ...................... 726/9
6,988,210 B1 * 1/2006 Audebert ....................... 726/9
7,124,302 B2 * 10/2006 Ginter et al. ............... 713/189

OTHER PUBLICATIONS

GMBH., Hannover, No. 13, p. 72, Jun. 21, 1999.
Preliminary Search Report dated Oct. 5, 2000.

* cited by examiner

DATA PROCESSING SYSTEM FOR APPLICATION TO ACCESS BY ACCREDITATION

This application is a continuation of prior application Ser. No. 09/723,284, filed Nov. 28, 2000 now U.S. Pat. No. 6,988,210.

BACKGROUND OF THE INVENTION

1. Field of the Invention

The invention relates to improvements to data processing systems in which access of a user to one or more programs, for example applications, is controlled by one or more credentials.

2. Description of the Prior Art

The security of a data processing system, and in particular the security of access to programs such as operating systems or applications (home banking, e-commerce, etc.), is based on authentication of the user by means of static credentials which usually consist of a name assigned to the user (their "login name") and a static password.

In the remainder of this document the expression "data processing system" means any system comprising a personal computer, a telephone, a mobile telephone, or a personal digital assistant, etc. enabling a user to execute either a local application or the client part of an application, for example in the context of a client-server architecture.

Authentication protocols based on a user knowing a static password are known in the art:
- basic authentication: the password is transmitted in clear to a server-end authentication module;
- encrypted password: a session key is transmitted using a public key algorithm (for example a DIFFE-HELLMAN algorithm), which enables a secure channel to be set up between two entities via which the password is transmitted, without it being necessary for those entities to share a secret password between them beforehand;
- digest authentication: the client part of the application encrypts the password (or a digest of the password) using a challenge sent by the server-end authentication module;
- Kerberos: the credentials are transmitted to the user by the server-end authentication module, encrypted using the user's password, so that only the user can use the credentials.

However, static passwords are vulnerable in a number of ways, because they can be divulged (if knowledge of the password is gained legitimately or fraudulently by a third person), broken if they are weak (passwords used repetitively without modification, short passwords, dictionary attack), discovered by tapping a communication line or emulating an authentication server, or replayed by reproducing an authentication sequence.

To remedy the above drawbacks it is known in the art to use other mechanisms which are more secure than static passwords.

A first solution known in, the art consists of using dynamic passwords, i.e. passwords which are modified each time they are used. Dynamic passwords can be synchronous (modified synchronously at the user end and at the server-end, for example as a function of the time and/or the number of uses) or asynchronous (on each access request the server-end authentication module generates a different random challenge which is transmitted to the user end to generate the dynamic password by means of an appropriate algorithm).

In either case (synchronous or asynchronous passwords), secret keys are shared at the server-end and the user end. At the user end, the dynamic passwords can be generated by a personal security device (PSD) such as a smart card, a secure portable electronic device ("token"), etc.

Another solution uses public key cryptographic systems, the user holding a private key and the public key being certified by a certification authority. An authentication sequence using a system of this kind can proceed as follows:
- the user transmits a certificate (containing their login name, public key, address, etc.) to the server;
- on receiving the certificate, the authentication module of the server generates a challenge and sends it to the user;
- the user signs the challenge using their private key; and
- the authentication module verifies the signed challenge using the public key and authenticates the user if there is a match.

Solutions based on a dynamic password or public key replace authentication mechanisms based on a static password or call on an external authentication server.

It is also known in the art to use a single sign on (SSO) server (password server) by means of which, through a single authentication and authorization process, a user can access all computers and systems they are authorized to access without having to enter many different passwords. Once they have been authenticated, by an authentication process employing a strong password (a password including a large number of characters), the user can request the password server to execute an application. The password server then loads into the user's terminal a set of data including the user's credentials for the requested application, enabling the terminal to start running the application. However, this solution requires a specific authentication (SSO) server and is still based on a first authentication of the user vis-à-vis that server on the basis of a static password.

OBJECTS AND SUMMARY OF THE INVENTION

The invention aims to improve the security of mechanisms by which, using static credentials (login name, password, etc.), users at a terminal can authenticate themselves vis-à-vis a program executed either locally in that terminal or partly in the terminal and partly in a server to which it is connected.

Another object of the invention is to provide a data processing system including improved mechanisms for controlling access to one or more applications in which the authentication protocol based on sharing of static and secret credentials between the customer end and the server-end of an application is not modified and the authentication module of the server-end application remains the same.

To this end, the invention provides a data processing system for executing at least one program to which access by a user is controlled by the provision of credentials assigned to said user, said system including:
- at least one terminal including data processing means for executing at least part of said program,
- first memory means associated with said program for storing at least first credentials specific to said user, and access control means for authorizing access to said program in response to a match between said first credentials stored in said first memory means and second credentials applied via said terminal to said program,
- at least one security device personal to said user, associated with said terminal and including second memory means for secure storage of said second credentials, said terminal including at least some of credentials management means (CMP) including:
means for reading and transmitting credentials to read said second credentials stored in said second memory means and transmit them to said access control means in response to presentation of a request to access said program, and credentials updating means for selectively commanding the generation and loading into said first and second memory means of new credentials replacing said first and second credentials previously stored.

Other features and advantages of the invention will be apparent to those skilled in the art from a reading of the following brief description of the drawings, the detailed description of the invention, and the appended claims.

DESCRIPTION OF THE PREFERRED EMBODIMENTS

Figure 1:
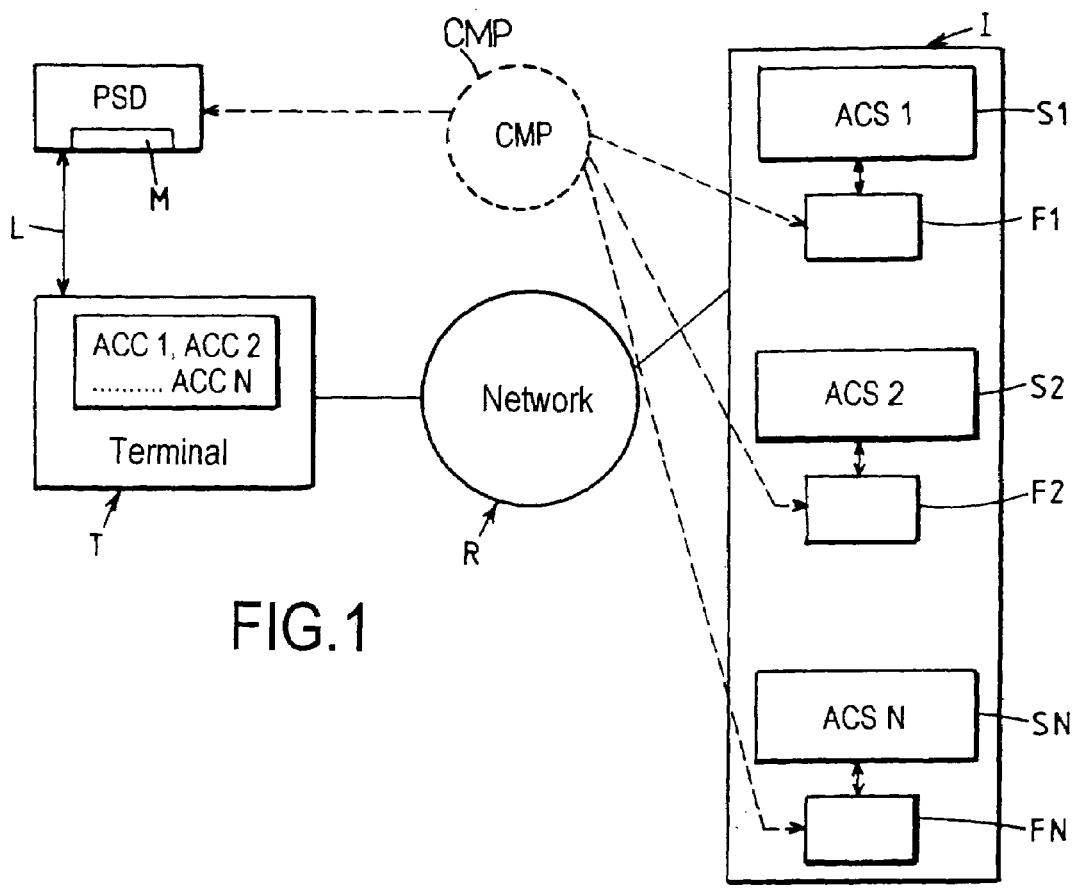
FIG. 1 is a general block diagram of a data processing system constituting a first embodiment of the invention in the case of an application executed partly in a terminal and partly in a server.

Referring to FIG. 1, the data processing system shown comprises a terminal T which is connected to a personal security device PSD and to an information system I via a network R. The personal security device PSD is linked to the terminal T by means L providing bidirectional transmission of information between them.

Examples of the terminal T include a personal computer, a telephone, a mobile telephone, a personal digital assistant, etc. It is conventionally provided with user interface means, data processing means (microprocessor) and appropriate memories (not shown). By means of appropriate programs ACC1, ACC2, ACCN, the terminal T is capable of executing applications A1, A2, . . . , An when linked via the network R to servers $S_1, S_2, \ldots, S_n$ containing respective programs $ACS_1, ACS_2, \ldots, ACS_n$. Of course, in contradistinction to what is shown in the figure, each server $S_1, S_2, \ldots, S_n$ of the information system I could use a plurality of applications. To summarize, the software of each application is divided between the terminal T and one of the servers of the information system I: the application A1 comprises the software ACC1 and the software $ACS_1$, the application A2 comprises the software ACC2 and the software $ACS_2$, and the application An comprises the software ACCN and the software $ACS_N$.

The network R providing bidirectional transmission of data between the terminal T and the servers $S_1, S_2, \ldots, S_n$ of the information system I can be of any kind, for example the Internet.

In the context of this application, a personal security device PSD is a device held exclusively by and/or accessible exclusively to a user who is duly authorized (for example by means of a personal identification number PIN or otherwise) and enabling the secure storage therein of data with guaranteed security against reading and/or writing of data by an unauthorized person.

For example, the device can be a smart card, an electrically powered portable electronic device (token) including a limited number of input and output ports and software and hardware protection means barring access to the internal buses on which the data travels in the device. In the case of a smart card, for example, the means L providing the link to the terminal T comprise a smart card reader which can be integrated into the terminal T or external to it.

As an alternative to this, the personal security device can take the form of software installed in the terminal T and enabling secure storage of optionally encrypted data in the terminal. This embodiment does not offer the same level of security as a smart card, but nevertheless represents a significant improvement in that the credentials of the user can be modified automatically, and therefore frequently. This is explained further below.

The personal security device PSD includes a memory M which stores credentials specific to the user of the terminal T and enabling that user to use the applications A1, A2, . . . , An. The credentials assigned to the user comprise a login name and a password specific to the application concerned, for example.

At the information system I end, the servers $S_1, S_2, \ldots, S_n$ include respective files $F_1, F_2, \ldots, F_n$ storing the credentials of all users authorized to access an application implemented by the server concerned. Thus the credentials of the user of the terminal T are stored in the memory M and the file $F_1$ for application A1, in the memory M and the file $F_2$ for application A2, and in the memory M and the file $F_N$ for application An.

Of course, the data processing system shown in FIG. 1 can include a plurality of terminals T connected by the network R to the information system I and intended to be used by different users.

To execute an application (home banking, e-commerce, etc.), a user launches the application on their terminal T. Access to the personal security device PSD can be conditional on the entry of a personal identification number PIN by the user via the terminal T. Once the request for access to the device PSD has been accepted, the credentials of the user relating to the application concerned are read in the personal security device PSD and transmitted to the server concerned. The server compares the credentials received from the terminal T with those contained in its credentials file and authorizes execution of the application if they match.

A credential management program CMP is provided for managing credentials for authentication vis-à-vis applications A1, A2, . . . , An and for updating credentials. As described in more detail below, the program CMP is divided between the terminal T and the servers $S_1, S_2, \ldots, S_n$ assigned to the various applications.

For authentication vis-à-vis a given application, the terminal T must read the credentials relating to that application in the personal security device PSD.

To this end, it is possible to replace the standard client-end or terminal-end application with a modified application which manages communications with the device PSD in addition to managing the standard characteristics of the application. This type of implementation corresponds to the embodiment shown in FIG. 2.

It is also possible, without modifying the standard client-end or terminal-end application, to use dedicated software to read the credentials in the device PSD and transmit them to the application concerned. Solutions for achieving this include, for example: emulating the keyboard, or sending a message containing the credentials. This second solution corresponds to the embodiments shown in FIGS. 5, 7 and 8.

Figure 2:
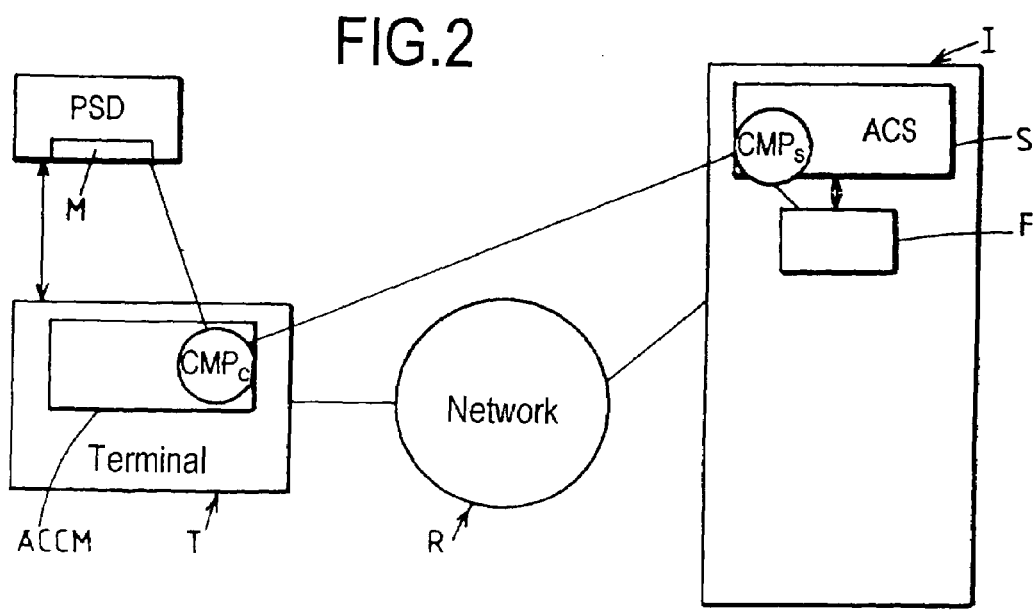
FIG. 2 is a block diagram of a first embodiment of the data processing system shown in FIG. 1.

Turn now to FIG. 2, which for simplicity shows only one server S. In the FIG. 2 embodiment, the terminal-end credentials management program takes the form of a modified client-end application $ACC_M$. The part $CMP_C$ of the credentials management program is represented by a circle. The credentials management program $CMP_S$ at the server S end is also represented by a circle: this program is that which exists as standard in any application for modifying the credentials of users or loading credentials relating to new users. The programs $CMP_C$ and $CMP_S$, which are respectively parts of the programs $ACC_M$ and ACS, together form the credentials management program CMP shown in FIG. 1.

In the FIG. 2 embodiment the credentials management program integrated into the application A have direct access to the personal security device PSD, via the modified client-end program $ACC_M$, and to the credentials file F of the server S.

To enable a user running application A to benefit from an improvement in the security of the authentication process, a security administrator supplies the user with a device PSD containing no credentials. The device PSD does not contain any static password.

The user connects their device PSD to their terminal T and initializes a personal identification number PIN in the terminal.

The user then installs the modified client-end application $ACC_M$ instead of the standard client-end application previously used.

The first time the program $ACC_M$ is used to access the application, the user enters their personal identification number PIN to authorize access to the device PSD and then opens access to the application by means of the static credentials known to the user and previously used with their standard client-end application. The current credentials are presented to the server-end application ACS using the standard authentication protocol.

Once the server-end application has been opened, the part $CMP_C$ of the client-end application $ACC_M$ generates a random password, presents a change of password request to the server-end software $CMP_S$, to which it transmits the new password, and then loads the static credentials, comprising the password generated in this way and possibly the login name, into the device PSD. The new static password generated is then stored in the file F and in the memory M but is not known to the user. This mechanism enables the use of strong passwords, i.e. complex passwords (words not found in a dictionary, difficult to remember and therefore to guess, etc.) comprising a large number of characters, which offer a much greater resistance to hacking than short passwords which are used in practice when they must be remembered or entered at the keyboard by a user.

The next time the user accesses the application, the user has only to enter their personal identification number PIN via the terminal, the authentication process then proceeding automatically by reading the credentials in the device PSD and transmitting them via the program $CMP_C$ to the server-end program $CMP_S$. During this authentication process, the credentials are never displayed on the screen of the terminal T and therefore remain unknown to the user, which strengthens the security of the system.

Figure 3:
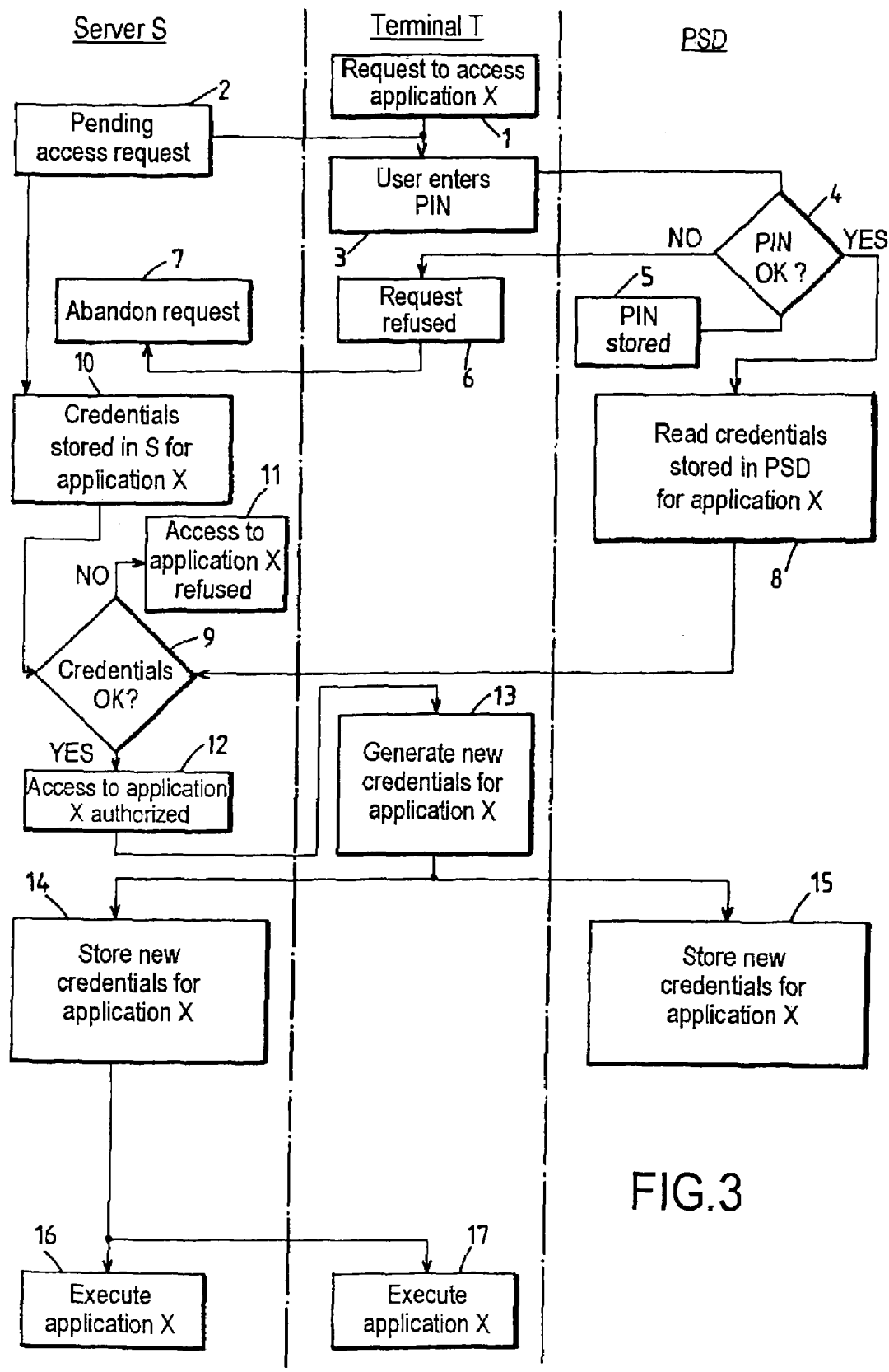
FIG. 3 is a flowchart showing a first mode of updating credentials in the data processing system shown in FIG. 2.
Figure 4:
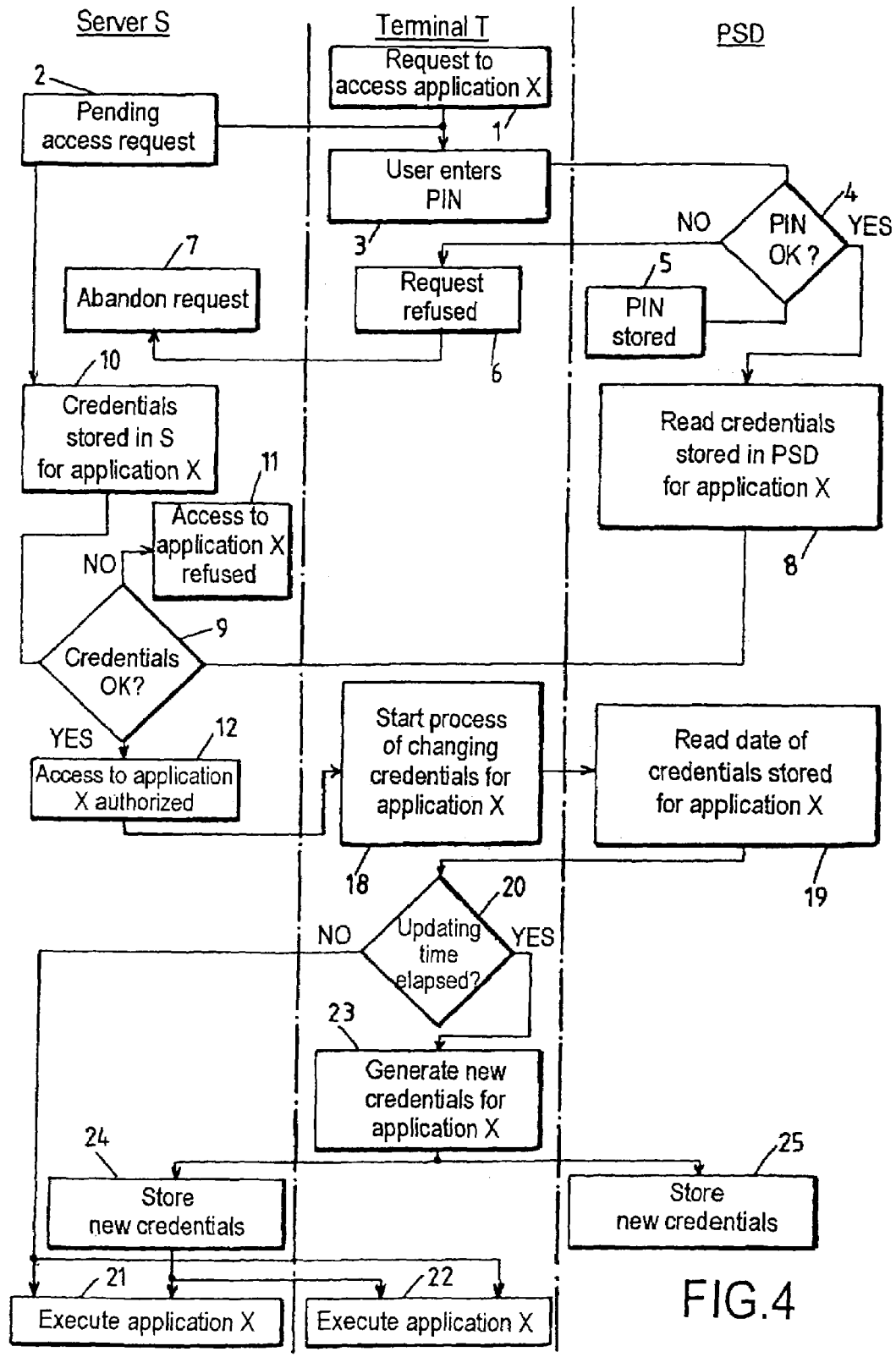
FIG. 4 is a flowchart showing a second mode of updating credentials in the data processing system shown in FIG. 2.

The static password can then be updated or changed each time the application concerned is accessed, as shown in FIG. 3, or periodically, for example daily, as shown in FIG. 4, or at the specific request of the system administrator.

Referring to FIG. 3, the user formulates a request to access an application X at the terminal T (step 1) and that request is processed by the server S (step 2). The user enters their number or personal identification number PIN via the terminal T (step 3) and it is transmitted to the device PSD, which in step 4 compares the number entered by the user with that stored in the device PSD (5).

If the PIN number entered by the user does not match the stored number (5) the access request is refused (step 6) which causes the server S to abandon the request (step 7).

If the result of the step 4 test is positive, the device PSD reads the credentials (static password) stored in the device for application X (step 8) and the credentials are transmitted via the terminal T to the server S where they are compared (step 9) with the credentials (static password) stored in the file F for the application X and the user concerned (step 10). If the data compared in step 9 does not match, access to the application X is refused (step 11). If the data does match, access to application X is authorized by the server S (step 12) and the terminal T generates new credentials for application X (step 13).

The new credentials (random password) are transmitted to the server S and to the device PSD (steps 14 and 15) where they are respectively stored in the file F and in the memory M. The process terminates with execution of application X at the server S and terminal T, respectively (steps 16 and 17).

Alternatively, as shown in FIG. 4, the credentials (static password) can be modified or updated if a predetermined time has elapsed since the last time the password was changed. The process employed is identical to that shown in FIG. 3 up to step 12 and for this reason will not be described again.

After step 12, the terminal T initiates a process to change the credentials for application X (step 18), which leads to reading in the device PSD of the date at which the last credentials for application X were stored in the device PSD (step 19). Step 20 checks if a minimum time, for example one day, has elapsed since the last time the credentials were updated. If not, the credentials are not modified and execution of the application in the server S and the terminal T follows directly (steps 21 and 22).

If step 20 determines that the minimum time has elapsed, the terminal T generates new credentials for application X (step 23) which are respectively stored in the file F of the server S and the memory M of the device PSD (steps 24 and 25), with the date of updating stored at least in the memory M of the device PSD.

Figure 5:
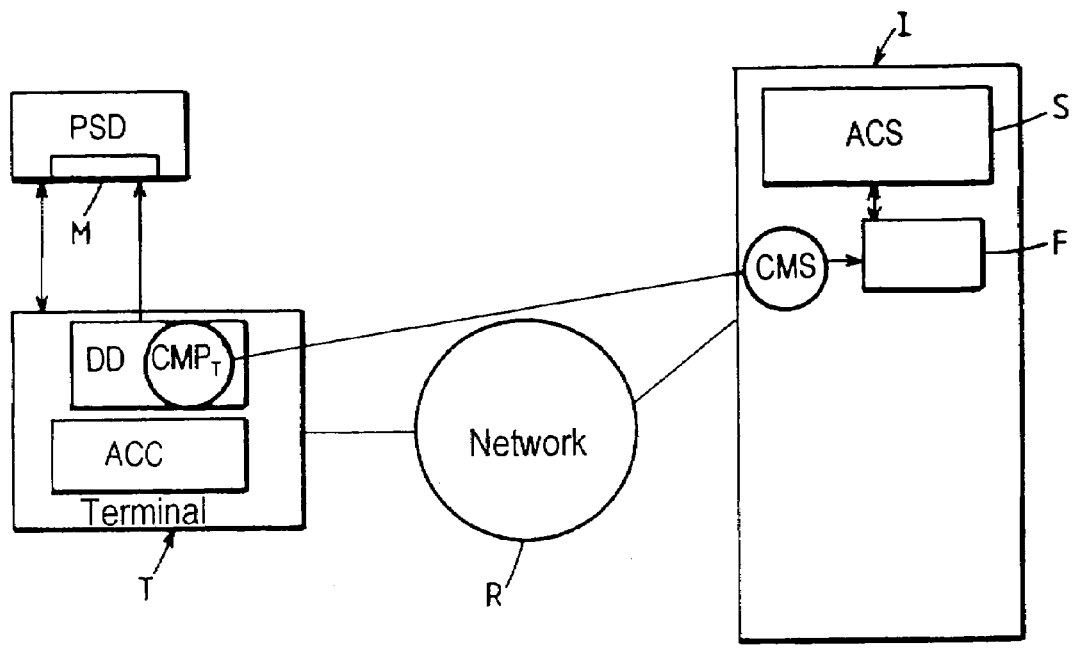
FIG. 5 shows a second embodiment of the data processing system shown in FIG. 1.

The embodiment of the invention shown in FIG. 5 uses a different implementation of the credentials management program from that shown in FIG. 2. At the terminal T end, the credentials management program is part of a Drag-and-Drop application DD which is independent of the terminal-end or client-end application ACC. At the information system I end a credentials management software module CMS independent of the server-end application ACS manages the file F of credentials associated with the server S. The module CMS can be implemented in the server S or in an independent server. As in FIG. 2, it must be understood that implementing the invention does not imply any modification of the hardware or software of the information system 1.

The following description assumes that a user of terminal T is already authorized to access an application executed at the terminal end by the client-end application ACC and at the server end by the server-end application ACS. The user is also assumed to be in possession of credentials enabling them to authenticate themselves to the application and open it.

In order to implement the improved security mechanisms according to the invention, the security administrator gives the user a blank device PSD, i.e. a device containing no credentials.

The user then connects their device PSD to their terminal T and installs the application DD in the terminal. The user also initializes the personal identification number PIN controlling access to their personal security device PSD.

The user is asked for the old credentials, which are communicated to the credentials management module CMS by the application DD in order to authenticate the user. New credentials (static password) are generated by the application DD and transmitted to the module CMS which updates the credentials file F either directly or via the program ACS. The new credentials are not known to the user and can include a "strong" static password (see above).

To use the application, the user starts the application DD, enters their personal identification number PIN to enable access to the device PSD and enters into the program ACC the static credentials read by the application DD in the device PSD, for example by means of a Drag-and-Drop operation using the application DD and a mouse. The mechanisms enabling the credentials contained in a personal security device PSD to be entered into an application by means of a Drag-and-Drop operation are described in co-pending US patent application filed by this applicant under the title "Data processing system for application of credentials to a program or a service", which is incorporated herein by reference. When the credentials are loaded into the application they are not shown on the screen of the terminal and remain unknown to the user.

Figure 6:
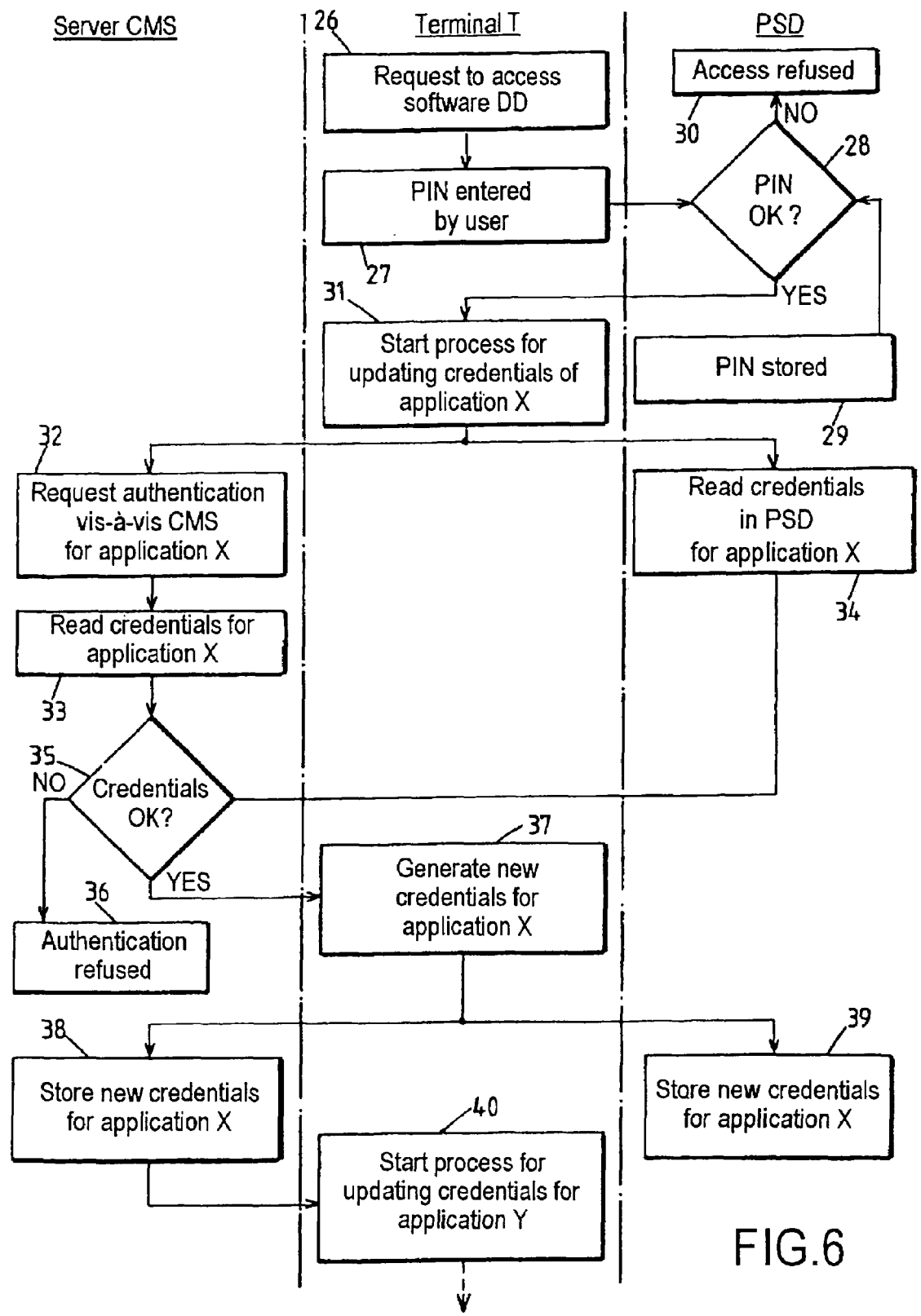
FIG. 6 shows one mode of updating credentials in the data processing system shown in FIG. 5.

The process for updating or modifying credentials will now be described with reference to the FIG. 6 flowchart. This process is executed each time that the user launches the application DD on the terminal T.

In step 26 the user requests access to the application DD at the terminal T. The user enters their personal identification number PIN in step 27 and in step 28 the PIN is compared in the device PSD with the personal identification number PIN stored in it (29). If the two numbers do not match, access is refused (step 30). If the two numbers match, a process for updating the credentials for application X is initiated (step 31). In the module CMS, this process leads to a request for authentication of the user for application X (step 32) and reading of the user's credentials for application X currently stored in file F (step 33).

In parallel with this, the process initiated in step 31 leads to reading the credentials of the user for application X in the device PSD (step 34). The credentials are transmitted to the module CMS via the terminal R.

In step 35 that module compares the data read in the file F in step 33 and the data read in the memory M of the device PSD in step 34. If they do not match authentication vis-à-vis the module CMS is refused (step 36) and the credentials are therefore not modified.

Otherwise, in the terminal T, the application DD generates new credentials for application X (step 37). Those new credentials are stored in the file F via the module CMS (step 38) and in the device PSD (step 39).

If the device PSD contains credentials relating to more than one application, the part $CMP_T$ of the application DD then initiates a process for updating the credentials for application Y (step 40). The same process updates the credentials for all applications for which the device PSD contains credentials.

Of course, as described with reference to FIG. 4, generating new credentials (static password) can be conditional on a predetermined time elapsing from the generation and storage of the credentials currently stored in the device PSD.

Note that in this second embodiment of the invention connection of the terminal T to the module CMS does not precede access to the application. Access is effected as described with reference to FIG. 2, by sending the credentials to the server-end application ACS and, if access to the module CMS to modify the credentials is not possible, for example if the module CMS is implemented on a server other than the server S, access to the application supported by the server S is nevertheless possible using the unmodified credentials contained in the memory M and the file F. Updating the credentials is merely deferred until a connection with the module CMS can be set up when the application DD is launched some other time. The system according to the invention therefore differs in all respects from the password server systems which require a connection to be set up beforehand from the terminal to the password server to enable access to an application.

Figure 7:
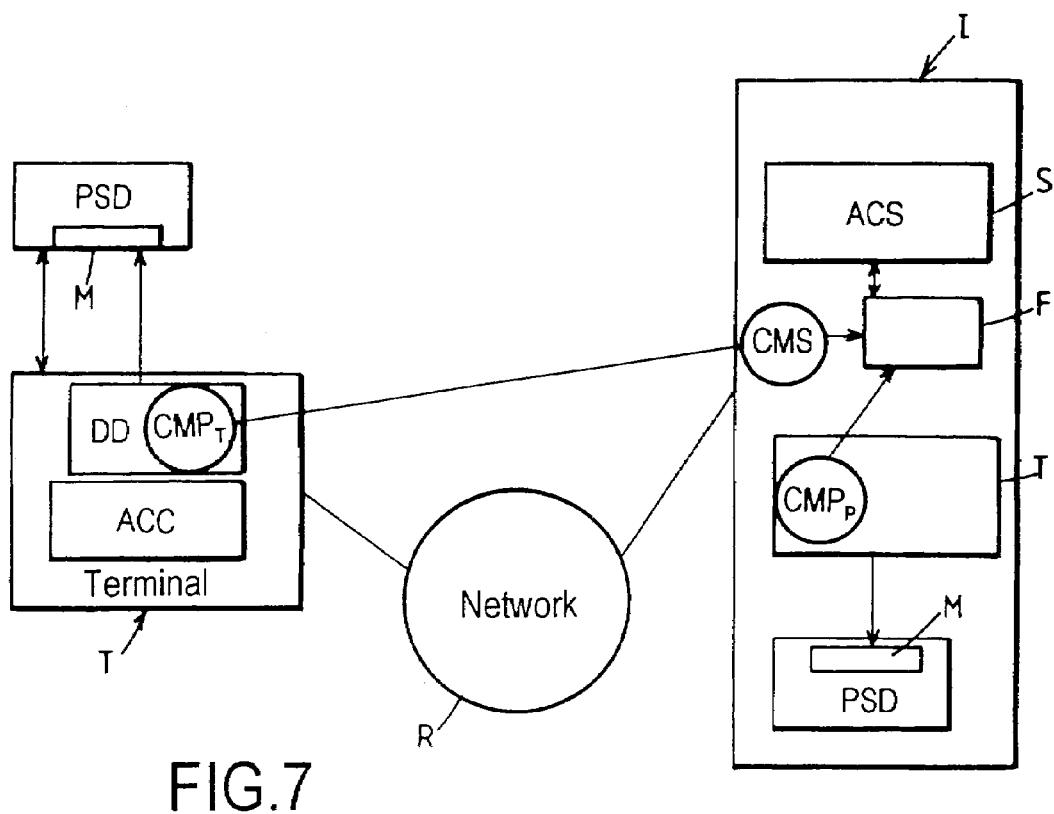
FIG. 7 shows a third embodiment of the data processing system shown in FIG. 1.

FIG. 7 shows an embodiment of the invention which differs from that shown in FIG. 5 only in respect of the means for initializing and personalizing the system.

The system shown in FIG. 7 includes a personalizing tool T provided with a credentials management program $CMP_P$ enabling a security administrator to initialize the credentials relative to a user for a given application in the file F of the server supporting the application concerned and in the personal security device PSD intended for the user. This means that, in addition to the initial credentials, the personal identification code PIN is loaded into the device PSD by means of the personalization tool T. The credentials of the user for the application concerned can instead be initialized or updated directly by the security administrator, using standard administration tools provided for defining the rights of the user vis-à-vis the application.

In a second phase the device PSD and the associated PIN code are sent back to the user via separate channels, as is standard practice, in particular with smart cards.

The user then connects their device PSD to their terminal T and loads the application DD into their terminal.

To access an application, the user launches the application DD, enters their PIN code to enable access to the device PSD and then, using the application DD, and as previously described with reference to FIG. 5, enters into the program ACC the credentials read in the device PSD by a Drag-and-Drop operation using a mouse.

Otherwise, the credentials are updated periodically as described with reference to FIG. 5.

Note that the initialization and personalization process could instead be implemented in the case of a hardware and software architecture like that described with reference to FIG. 2, i.e. in the situation where the credentials management program is an integral part of the client-end application ACC$_M$ and the server-end application ACS.

Figure 8:
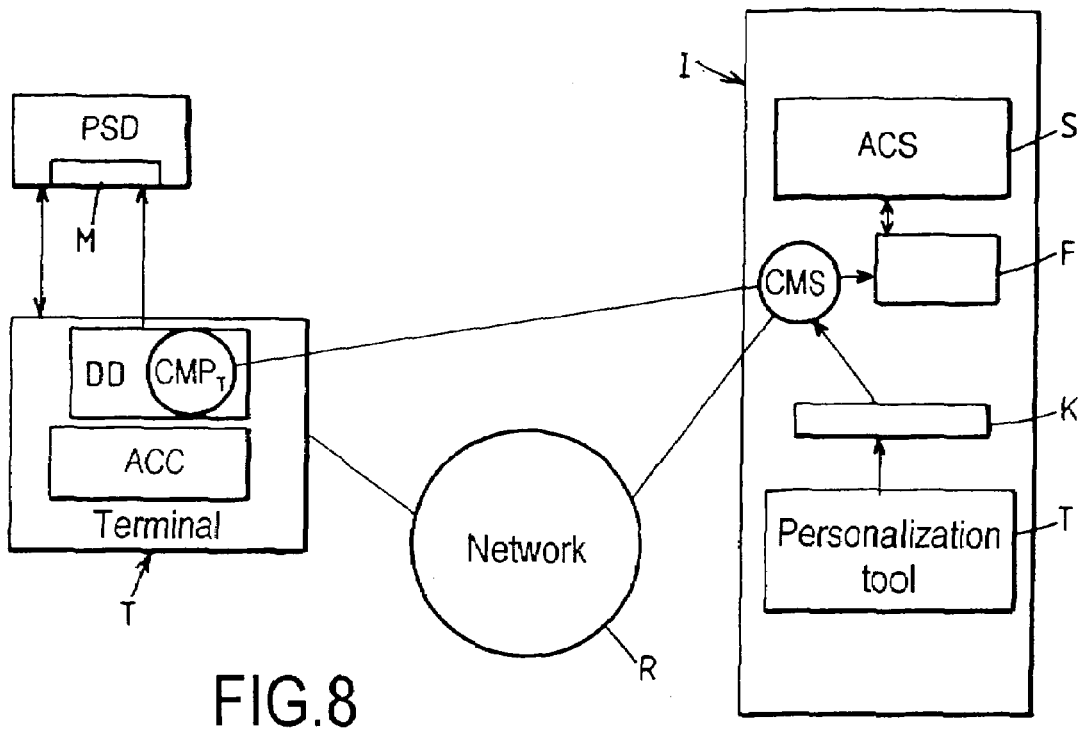
FIG. 8 shows a fourth embodiment of the data processing system shown in FIG. 1.

FIG. 8 shows a variant of the initialization and personalization process shown in FIG. 7.

In FIG. 8, the credentials of the users are generated by a personalization tool under the control of a security administrator and are stored, for each user, in an initial credentials file K associated with the credentials management module CMS. The security administrator supplies the user with a blank device PSD, i.e. a device containing no credentials. An initial authentication password, also stored in the file K, is transmitted to the user via a separate channel.

The user connects the device PSD they have received to the terminal T and if necessary installs the application DD. The user also allocates their device PSD a personal identification number PIN. The user then connects to the credentials management module CMS by means of the application DD and authenticates themselves vis-à-vis that software by entering the initial authentication password communicated to them. Once the user has been authenticated, the module CMS loads into the application DD the initial credentials stored for the user concerned in the file K. The initial credentials are transferred by the application DD into the device PSD, in which they are stored. In parallel with this, the initial credentials of the user are loaded by the module CMS into the file F, or updated in that file if the user was already accredited for the application concerned.

Then, as described with reference to FIGS. 5 to 7, all the user has to do to authenticate themselves vis-à-vis the application is enter their PIN code and then load the credentials read by the application DD in the device PSD into the program ACC, using the application DD. Of course, as in the previous embodiments, when loading the credentials by means of a Drag-and-Drop operation using the mouse and the application DD, the credentials are not displayed on the screen of the terminal and are therefore not known to the user.

After initialization and personalization, the credentials are updated as described with reference to FIGS. 5 and 7.

Figure 9:
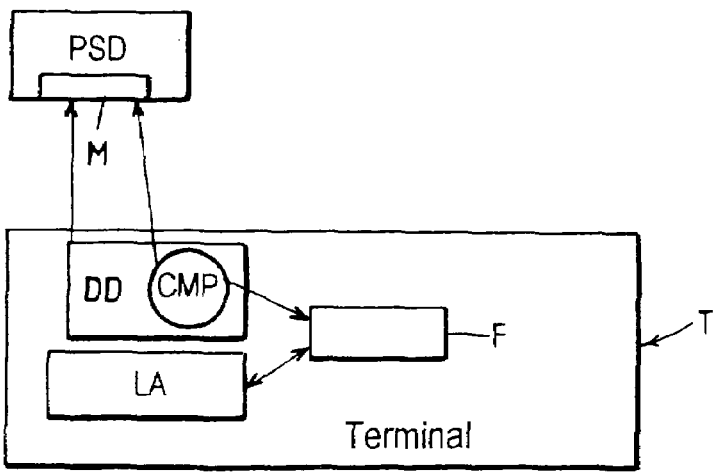
FIG. 9 shows a data processing system constituting a second embodiment of the invention in which one or more applications are executed locally in a terminal.

FIG. 9 shows a second embodiment of the invention in which the application is executed entirely locally in the terminal T by means of an application LA loaded into the terminal. In this case the credentials file F is stored in the terminal T. The credentials management program CMP is also executed locally and forms part of the Drag-and-Drop application DD. The program CMP has direct access to the personal security device PSD and can access the file F either directly, as shown, or via the application LA.

Initially, the security administrator supplies the user with a blank device PSD containing no credentials.

The user connects their device PSD to their terminal T, loads the application DD and assigns a personal identification code PIN to their device PSD.

The application DD needs the old credentials of the user for the application LA for authenticating the user. The application DD generates new credentials which are loaded into the device PSD and replace the old credentials in the file F, either directly or via the application LA.

To access the application LA, all that the user then has to do is launch the application DD, enter their PIN code enabling access to the device PSD and load the credentials into the application LA by means of a Drag-and-Drop operation, as described with reference to FIGS. 5, 7 and 8. It must again be understood that the credentials are not displayed on the screen during this operation and consequently remain unknown to the user.

Figure 10:
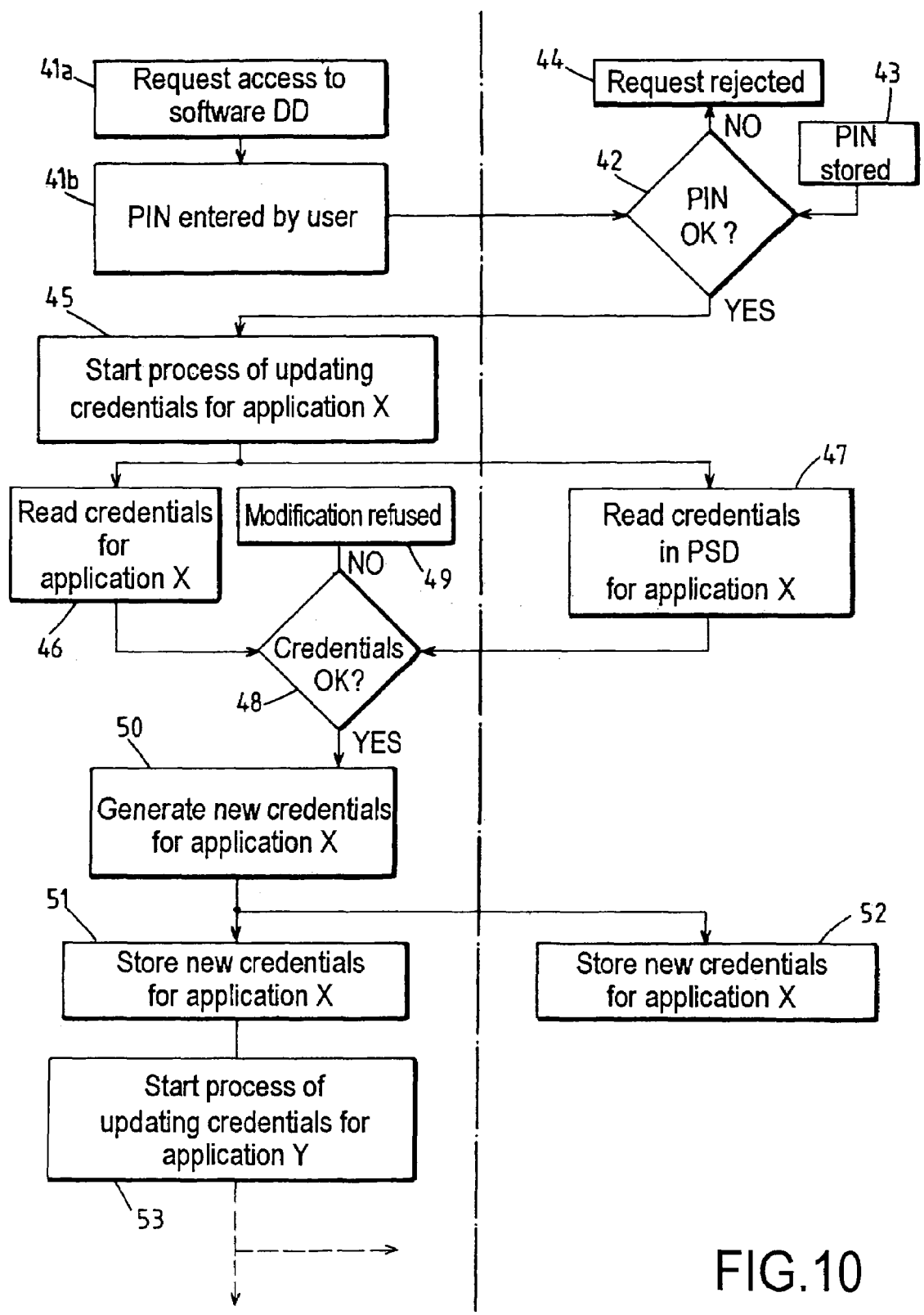
FIG. 10 shows one mode of updating credentials in the data processing system shown in FIG. 9.

The process of updating the credentials in the context of the data processing system shown in FIG. 9 is illustrated by the FIG. 10 flowchart.

Having requested access to the application DD in step 41a, the user enters their PIN code into the terminal T in step 41b and the code is transmitted to the device PSD, which in step 42 compares it with the PIN code stored in it (43). If they do not match, the request is rejected (step 44).

If they do match, the application DD initiates a process for updating the credentials for application X (step 45). To this end, it reads the credentials stored for application X in file F (step 46) and those stored for the same application X in the device PSD (step 47). The credentials are compared (step 48) and modification of the credentials is refused (step 49) if they do not match.

If they do match, the application DD generates new credentials for application X (step 50) which are stored in the file F (step 51) and in the device PSD (step 52).

If the terminal T is equipped with software for several applications X, Y, etc., a new process of updating the credentials for application Y is initiated in step 53, and the same process is repeated for all the applications.

It follows from the foregoing description that the system described can authenticate users by means of static credentials and in particular a static password, which credentials remain unknown to the user. The user therefore does not need to remember a password and is therefore not tempted to write their password down anywhere so that they do not forget it.

The static password can be complex and of the maximum length compatible with the application concerned, given that the user does not need to memorize it or enter it into their terminal.

What is more, the static password is periodically updated automatically, i.e. not subject to the discretion of the user. The "strong" and periodically renewed static password is stored in a security device which is personal to the user, of the smart card or similar type or of the purely software type, which offers a very high level of protection against illegitimate attempts to read the data contained therein.

Finally, to access an application, the system described does not require real time connection of the terminal to any server other than that on which the application may be partly executed. Although in the embodiments shown in FIGS. 5, 7 and 8 the credentials management module CMS can be installed on a server independent of that in which the application is partly executed, it nevertheless remains a fact that the connection to the independent server is not necessary for accessing the application. The system described is therefore fundamentally different from password server systems.

Also, the system described does not entail any modification of existing servers, the only modifications needed concerning the software to be installed on the terminal(s). The data processing system described therefore considerably strengthens the security of existing systems using authentication by static credentials to access one or more applications.

It goes without saying that the embodiments described are merely examples which can be modified, in particular by substitution of technical equivalents, without departing from the scope of the invention. For example, the credentials could be updated, not as described on the occasion of each access to an application or after a predetermined time period has elapsed, but as a function of a number of events. A counter can be incremented on each authentication request or on each access to the credentials. At the time of each authentication request or of each access to the credentials, the content of the counter is compared with a threshold value and the credentials are modified if the threshold value has been reached. The threshold can be chosen so that the credentials are updated at the time of each successful authentication in relation to an application, as described with reference to FIG. 6.

It must be understood that the expression "credentials" used in the description and claims designates the credentials as such (password, login name, etc.) used for authentication vis-à-vis an application and one or more secret or private keys for calculating one or more credentials as such. The updating of the "credentials" referred to above can therefore concern either the credentials as such and/or secret or private keys for calculating credentials as such.

The invention claimed is:

1. A method for executing at least one application to which access by a user is controlled by the provision of credentials assigned to said user, said method including:
   (a) determining whether a match exists between first credentials stored in a first memory section and second credentials supplied by a user; and
   (b) authorizing access to said application in response to an identified match between said first credentials stored in said first memory unit and said second credentials supplied by the user via a security device that is personal to the user and that includes a second memory section for storage of the second credentials; and
   (c) performing at least some credentials management comprising:
      reading said second credentials stored in said second memory section in response to presentation of a request to access said application,
      selectively activating automatic generation and automatic loading into said first and second memory section of new credentials replacing previously stored versions of said first and second credentials, and
      activating automatically said credentials updating each time a match of said first and second credentials has been identified.

2. The method according to claim 1, wherein step (b) includes authorizing access to said application in response to identification in step (a) of a match between said first and second credentials.

3. The method according to claim 1, wherein said second memory section stores a first identification code of said user, said personal security device comprises an identification code validation section, said method further comprising:
   applying a second identification code to said personal security device, and authorizing access to said personal security device in response to identification of a match between said first and second identification codes.

4. The method according to claim 1, wherein said credentials management includes activating said automatic generation and said automatic loading of said new credentials without communicating said new credentials to said user.

5. The method according to claim 1, wherein said credentials management includes activating said automatic generation and said automatic loading of said new credentials upon authorization of access by said access control section.

6. The method according to claim 5, wherein said credentials management includes:

dating and loading into at least one of said first and second memory sections the date at which said credentials are generated, and inhibiting generation of said new credentials until a particular time has elapsed since the generation of previous versions of said credentials stored in said first and second memory sections.

7. A data processing system for executing at least one program to which access by a user is controlled by the provision of credentials assigned to said user, said system including:
   at least one terminal including a data processor that executes at least part of said program,
   a first memory associated with said program that stores at least first credentials specific to said user, and
   an access control section that authorizes access to said program in response to an identified match between said first credentials stored in said first memory and second credentials applied via said terminal to said program,
   at least one security device personal to said user that is associated with said terminal and includes a second memory that provides secure storage of said second credentials or a secret for protecting said second credentials,
   said terminal including at least some of credentials management sections including:
      a reading and transmitting credentials section that reads said second credentials stored in said second memory and transmits the read second credentials to said access control section in response to presentation of a request to access said program, and
      a credentials updating section that selectively commands the generation and loading, into said first and second memories, of new credentials replacing, in response to the identified match of said first and second credentials, said first and second credentials previously stored.

8. The system of 7, wherein said system performs additional processing on the second credentials before presenting them to the access control section.

9. The system of 8, wherein the additional processing is a digest process.

10. The system of 8, wherein the additional processing is an OTP algorithm.

11. The system of 7, wherein the security device is a smart card.

12. The system of 7, wherein the security device is a software program and file.

13. The system of 7, wherein the security device is a secure storage and encryption device permanently attached to a computing terminal.

14. The system of 7, wherein the second credentials are protected by a secret stored on the security device, but the second credentials are not stored on the security device.

15. The system of 7, wherein the first credentials comprise a password or a login name.

16. The system of 7, wherein the second credentials comprise a password or a login name.

17. A data processing method for executing at least one program to which access by a user is controlled by the provision of credentials assigned to said user, said method including:

executing at least part of said program with at least one terminal including a data processor, storing at least first credentials specific to said user in a first memory associated with said program, authorizing access, with an access control section, to said program in response to an identified match between said first credentials stored in said first memory and second credentials applied via said terminal to said program, associating at least one security device that is personal to said user with said terminal, said security device including a second memory that provides secure storage of said second credentials or a secret for protecting said second credentials, and either: (1) reading, with a reading and transmitting credentials section of a credentials management section of said terminal, said second credentials stored in said second memory and transmitting the read second credentials to said access control section in response to presentation of a request to access said program, or (2) selectively commanding, with a credentials updating section of said credentials management section, the generation and loading, into said first and second memories, of new credentials replacing, in response to the identified match of said first and second credentials, said first and second credentials previously stored.

18. The method of 17, wherein said method includes steps which perform additional processing on the second credentials before presenting them to the access control section.

19. The method of 18, wherein the additional processing is a digest process.

20. The method of 18, wherein the additional processing is an OTP algorithm.

21. The method of 17, wherein the security device is a smart card.

22. The method of 17, wherein the security device is a software program and file.

23. The method of 17, wherein the security device is a secure storage and encryption device permanently attached to a computing terminal.

24. The method of 17, wherein the second credentials are protected by a secret stored on the security device, but the second credentials are not stored on the security device.

25. The method of 17, wherein the first credentials comprise a password or a login name.

26. The method of 17, wherein the second credentials comprise a password or a login name.

* * * * *